(12) United States Patent
Kohler

(10) Patent No.: US 6,778,300 B1
(45) Date of Patent: Aug. 17, 2004

(54) BLACK GENERATION FOR COLOR MANAGEMENT SYSTEM

(75) Inventor: Timothy L. Kohler, San Jose, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/572,830

(22) Filed: May 18, 2000

(51) Int. Cl.$^7$ .............. G03F 3/08; G06F 15/00; G06K 9/00
(52) U.S. Cl. .............. 358/529; 358/1.9; 382/162; 382/167
(58) Field of Search .............. 358/529, 518, 358/520, 519, 524, 530, 534, 502, 501, 503, 1.9, 1.16, 3.01, 445, 448, 452; 382/162, 164, 165, 167, 172; 345/610

(56) References Cited

U.S. PATENT DOCUMENTS

| | | | |
|---|---|---|---|
| 5,008,742 A | 4/1991 | Shigaki et al. | 358/79 |
| 5,329,385 A | 7/1994 | Washio | 358/515 |
| 5,331,440 A | 7/1994 | Kita et al. | 358/529 |
| 5,359,436 A | 10/1994 | Dichter et al. | 358/500 |
| 5,473,446 A | 12/1995 | Perumal et al. | 358/523 |
| 5,502,579 A | 3/1996 | Kita et al. | 358/518 |
| 5,528,386 A | 6/1996 | Rolleston et al. | 358/522 |
| 5,710,824 A | 1/1998 | Mongeon | 382/162 |
| 5,719,956 A * | 2/1998 | Ogatsu et al. | 382/167 |
| 5,739,917 A | 4/1998 | Shu et al. | 358/298 |
| 5,764,795 A | 6/1998 | Takeo et al. | 382/167 |
| 5,774,238 A | 6/1998 | Tsukada | 358/529 |
| 5,917,994 A | 6/1999 | Perumal, Jr. et al. | 395/109 |
| 5,999,703 A | 12/1999 | Schwartz et al. | 395/109 |
| 6,002,806 A | 12/1999 | Morikawa | 382/274 |
| 6,362,808 B1 * | 3/2002 | Edge et al. | 345/601 |
| 6,539,108 B1 * | 3/2003 | Kobayashi et al. | 382/162 |

OTHER PUBLICATIONS

"File Format for Color Profiles", International Color Consortium® Specification ICC.q:1998–09, © 1988.
Gary G. Field, "Color and Its Reproduction", Graphic Arts Technical Foundation, pp. 239–241, 341, 351, 354, © 1988.
"About black generation and separation types" from Adobe PhotoShop 4.0 online help, Mar. 2000.
"Adjusting the black generation and separation types" from Adobe PhotoShop 4.0 online help, Mar. 2000.

* cited by examiner

*Primary Examiner*—Mark Wallerson
*Assistant Examiner*—Thomas J Lett
(74) *Attorney, Agent, or Firm*—Fitzpatrick, Cella, Harper & Scinto

(57) ABSTRACT

Transformation of CMYK source color data from a source device into CMYK destination color data for rendering by a destination device, in a case which the "K" channel of the CMYK source color data was generated by a source black generation algorithm. A source color profile corresponding to the source device and a destination color profile corresponding to the destination device are accessed. The source color profile contains a first transform and a copy of or reference to the source black generation algorithm; the destination color profile contains a second transform. An inverse of the source black generation algorithm is applied to the CMYK source color data to generate CMY source color data, the first transform is applied to the CMY source color data to generate device-independent color data, the second transform is applied to the device-independent color data to generate CMY destination color data, and the source black generation algorithm is applied to the CMY destination color data to generate the CMYK destination color data.

23 Claims, 7 Drawing Sheets

BLACK GENERATION FOR COLOR MANAGEMENT SYSTEM

BACKGROUND OF THE INVENTION

1. Field of the Invention

The present invention relates to a color management system for transforming color data from a source CMYK (cyan, magenta, yellow and black) color space to a destination CMYK color space wherein the creation of the "K" channel of the source CMYK color data is performed by the same technique as that of the "K" channel of the destination CMYK color data.

2. Description of the Related Art

Color management systems are used for transforming color image data from the color space of an input device, such as a digital camera or scanner, to the color space of an output device, such as a printer or monitor. Generally, in color management systems such as the system of the International Color Consortium (ICC), the component colors of source color data are first transformed from a device-dependent color space for the source device into a device-independent profile connection space (PCS), such as CIELAB color space or a perceptual color space. The color data is then transformed from the PCS color space into a device-dependent color space for the destination device. For example, RGB color data from a color monitor are transformed into CIELAB color space and then are transformed from the CIELAB color space into the destination CMYK color space for a color printer.

Such color management systems generally produce desirable results and are able to match colors accurately viewed on, or acquired by, different devices. However, many times, particularly in color proofing operations, it is desirable to transform color image data from one CMYK color space to another CMYK color space, such as from the color space of one type of color printer to the color space of another type of color printer.

The "K" channel of the CMYK color space corresponds to an additional component added to a CMY color triad that is to be represented by black ink. There are many possible combinations of CMYK color values for any one CMY color triad, and the precise values for the CMYK color depends on how the "K" component is generated. For example, an ink jet printer utilizing CMYK colors can use a combination of cyan, magenta and yellow inks to create the appearance of the color black, instead of simply using black ink to create the appearance of the color black. A combination of cyan, magenta and yellow inks can be used with black ink to create a black appearance having a darker tone of black than that created by using black ink only. However, if the combination of cyan, magenta and yellow inks used to create a black appearance is not precisely determined, the resulting appearance will be brown and muddy.

In the alternative, the use of black ink only for black text and black lines results in a more consistent black appearance and also utilizes less ink to create the black appearance. Also, the use of multiple inks to print black text and/or lines can cause the text and/or lines to appear blurry or color-skewed. The use of cyan, magenta and yellow inks to create a black and/or gray color appearance requires a delicate color balance in order to avoid a non-black, brown and muddy appearance.

In general, when color data are generated for a source device, such as a first printer, the black "K" channel of CMYK source color data is generated by utilizing a black generation algorithm. The black generation algorithm modifies the values of the cyan, magenta and yellow components of the color data, and creates the black "K" channel of the CMYK color data based on the CMY values. For instance, if a pixel of color data utilizes ten percent cyan, ten percent magenta, and ten percent yellow to create a gray component of the pixel, these percentages are subtracted from the cyan, magenta and yellow components, respectively, and are replaced by a certain percentage of the "K" channel, such as ten percent "K". Accordingly, black ink is used in place of the cyan, magenta and yellow inks to create the gray component. This method of black generation algorithm is referred to as "gray component replacement" (GCR). It can be appreciated that the GCR method results in the use of less color ink to represent gray/black components of color pixels because black ink is instead utilized to create the gray/black component of such pixels.

Another method of black generation algorithm is referred to as "undercolor removal" (UCR). The UCR method of black generation algorithm is similar to GCR, but the UCR method only removes the gray/black components from shadow colors such as dark colors and colors which are close to neutral colors. For these shadow colors, the appropriate percentage of cyan, magenta and yellow corresponding to the gray/black component is subtracted from the respective color components and is replaced by a corresponding "K" component.

It can therefore be appreciated that many different types of black generation algorithms can be created by using a combination of GCR and UCR, or by creating unique black generation transformations, such as transformation curves, which transform CMY color data to CMYK color data, thereby generating the "K" channel of the source CMYK color data. The black generation transformations can be customized to create a specific desired appearance of gray/black components of color data. Accordingly, a developer can select or create a specific black generation algorithm in order to generate an optimal visual appearance of the color data depending on the type of source device and based on the type of color data (e.g. text or image data).

When performing a color management transformation from a source CMYK color space to a destination CMYK color space, such as in a proofing operation, the representation of black and gray components of color pixels in the destination color data may be substantially different than the representation of such components in the source color data. This can occur when the transformation sequence performed by the color management system uses a different black generation algorithm to generate the "K" channel of the CMYK destination color data than the black generation algorithm that was originally used to generate the "K" channel of the CMYK source color data.

For example, a color management system which converts CMYK source data into device-independent CIELAB color data and then into CMYK destination color data might always use the same GCR algorithm during the conversion from CIELAB color data to the CMYK destination color data. On the other hand, the CMYK source data might have been generated using an UCR algorithm, and the CMYK destination data might be generated with a GCR algorithm. Under these circumstances of a mismatch between the source color data and destination color data resulting from the different ways in which the "K" channel was generated, the "K" channel representation of the black and gray components of the color pixels in the CMYK destination color data will not match the "K" channel representation of the black and gray components of the color pixels in the CMYK source color data. This mismatch in representation styles of the black and gray components can cause undesirable effects in the rendering of the color data by the destination device.

For instance, black text may appear blurry if C, M and Y are used by the destination device to render black components of color pixels that were originally represented by the "K" channel alone in the CMYK source color data. In addition, an image that is rendered by the destination device using black ink only for black components of color pixels that were originally represented by C, M and Y in the CMYK source color data may appear lacking in contrast due to a lighter density of black that is rendered when using black ink instead of C, M and Y.

It has therefore been considered preferable to utilize the same style of black generation algorithm that was used to create the "K" channel of the source color data in order to create the "K" channel of the destination CMYK color data. The consistent use of the same style of black generation algorithm can improve consistency between the appearance of the black and gray components of the source CMYK color data and the black and gray components of the destination CMYK color data. The International Color Consortium (ICC) has defined a color management specification which currently provides a tag in the color profile format to identify a black generation algorithm. However, the ICC specification does not indicate how the tag is to be used in a color transformation sequence.

SUMMARY OF THE INVENTION

The present invention addresses the foregoing problems by providing a color management system in which the same technique used to generate the "K" channel of the CMYK source color data is accessed and utilized by the color management system in order to generate the "K" channel of the CMYK destination color data.

Because the same technique is used to generate both source and destination "K" channel data, it is possible to improve consistency between the appearance of the black and gray components of the source CMYK color data and the black and gray components of the destination CMYK color data. Moreover, the aforementioned ICC tag can be used for easy implementation of the present invention with an existing, agreed upon standard.

According to one aspect, the invention transforms CMYK source color data from a source device into CMYK destination color data for rendering by a destination device, in a case which the "K" channel of the CMYK source color data was generated by a source black generation algorithm. A color profile is accessed which contains a copy of or reference to the source black generation algorithm, and an inverse of the source black generation algorithm is applied to the CMYK source color data to generate CMY source color data. The CMY source color data is transformed into device-independent color data, and the device-independent color data is transformed into CMY destination color data. The source black generation algorithm which was obtained by accessing the source color profile is applied to the CMY destination color data to generate the CMYK destination color data.

By virtue of this arrangement, a color management system is provided in which the same black generation algorithm that was originally used to generate the "K" channel of the CMYK source data is also used to generate the "K" channel of the CMYK destination data, in order to preserve consistency in the representation of the black and gray components of color pixels between the original source color data and the destination color data, thereby preventing undesired effects in the rendered destination color data.

According to another aspect, the invention transforms CMYK source color data from a source device into CMYK destination color data for rendering by a destination device, in a case which the "K" channel of the CMYK source color data was generated by a source black generation algorithm. A source color profile corresponding to the source device and a destination color profile corresponding to the destination device are accessed. The source color profile contains a first transform and a copy of or reference to the source black generation algorithm; the destination color profile contains a second transform. An inverse of the source black generation algorithm is applied to the CMYK source color data to generate CMY source color data, the first transform is applied to the CMY source color data to generate device-independent color data, the second transform is applied to the device-independent color data to generate CMY destination color data, and the source black generation algorithm is applied to the CMY destination color data to generate the CMYK destination color data.

By virtue of this arrangement, a color management system is provided in which the same black generation algorithm that was originally used to generate the "K" channel of the CMYK source data is also used to generate the "K" channel of the CMYK destination data, in order to preserve consistency in the representation of the black and gray components of color pixels between the original source color data and the destination color data, thereby preventing undesired effects in the rendered destination color data. In addition, the color profile corresponding to the source device is used to efficiently transport the black generation algorithm to the color management system for use in generating the destination color data.

Preferably, the black generation algorithm is represented by a function or data table which is contained in the source device color profile, and the source black generation algorithm is one of a known set of algorithms, such as GCR, GCA and UCR, or is a custom set of CMY-CMYK conversion curves. Also, the color data management is preferably implemented in a color management program or a device driver.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color management system in which the same technique used to generate the "K" channel of the CMYK source color data is accessed and utilized by the color management system in order to generate the "K" channel of the CMYK destination color data. The present invention can be implemented in color management systems which are used to map color image data from the color space of one device, such as a first printer, to the color space of another device, such as a second printer. The color management system according to the present invention may be incorporated in an output device driver for execution in a computing device, such as a printer driver, embedded in the firmware of an output device, such as a printer, or provided in a stand-alone color management application for use on a general purpose computer. It can be appreciated that the present invention is not limited to these embodiments and that the present invention may be used in other environments in which color management is used.

Figure 1:
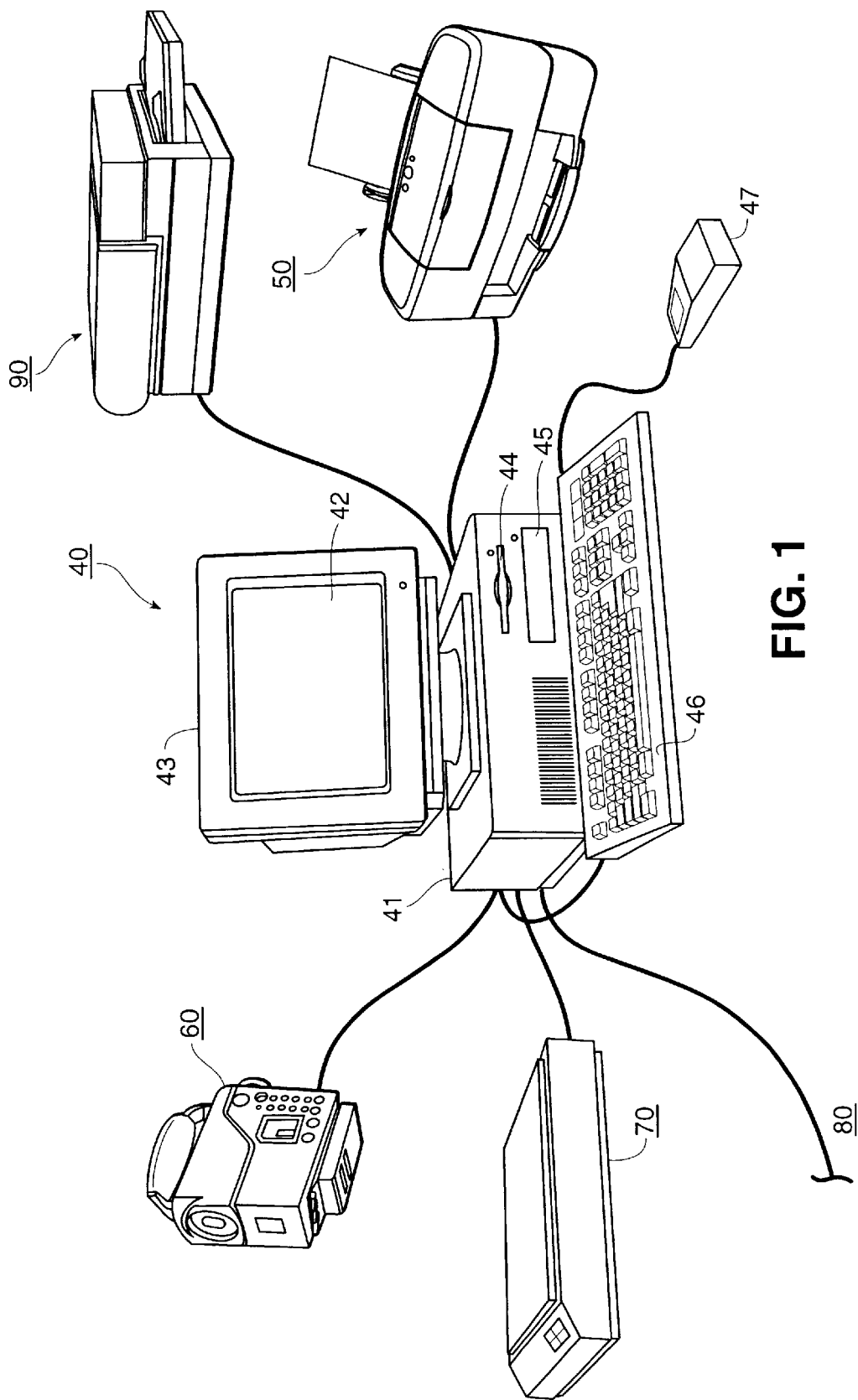
FIG. 1 is a representative view of a computer system in which the present invention may be implemented.

FIG. 1 is a view showing the outward appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a first printer, preferably a color bubble jet printer, which forms color images on a recording medium such as paper or transparencies or the like. Printer 90 is a second printer, preferably a laser printer, which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other printers that use such colorant combinations, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
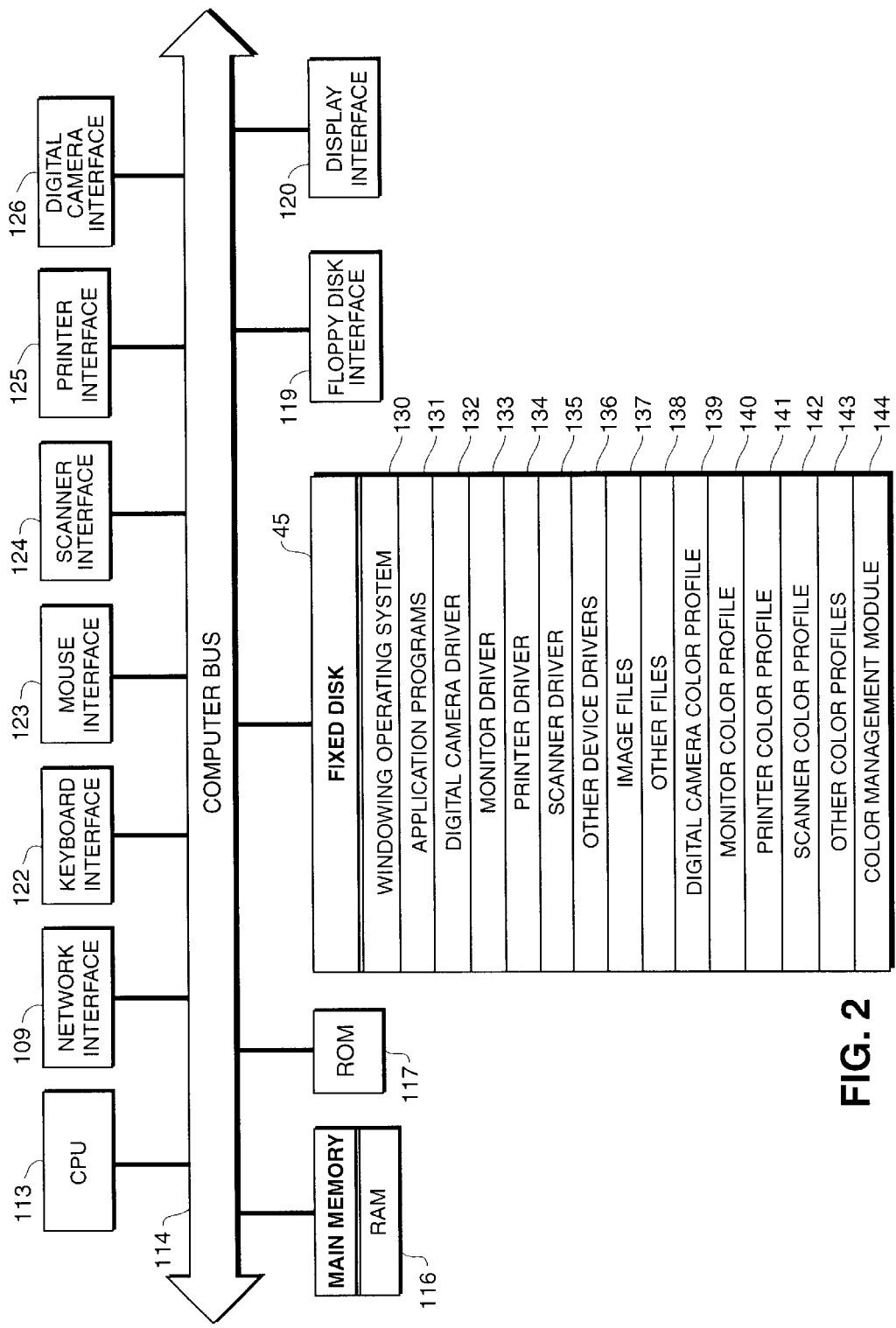
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50 and/or printer 90, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, digital camera color profile 139 for digital camera 60, monitor color profile 140 for monitor 43, printer color profile 141 for printer 50, scanner color profile 142 for scanner 70, and other color profiles 143 for other devices and peripherals (not shown). The present invention is preferably performed by computer-executable process steps which are stored on fixed disk 45 for execution by CPU 113, either as an integrated part of a device driver, such as printer driver 134, or as one of application programs 131 for performing image processing. In this regard, fixed disk 45 further includes color management module (CMM) 144 which is a program comprised of computer-executable process steps for implementing the present invention.

Figure 3A:
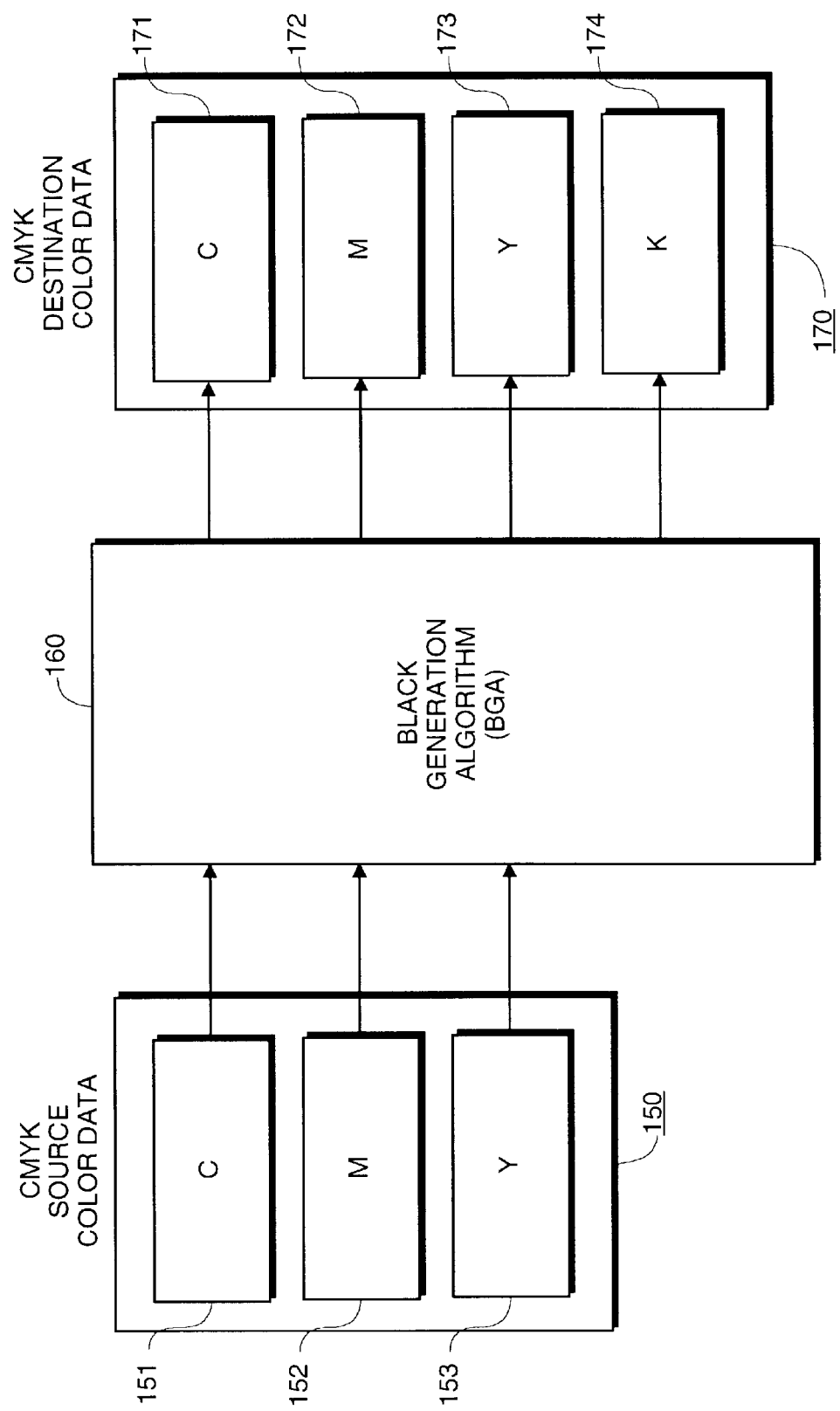
FIG. 3A is a view for providing a system level explanation of a black generation algorithm according to the present invention.

Turning to FIG. 3A, a view is provide for explaining the application of a black generation algorithm to generate a K component from a CMY triad, and to adjust the CMY triad accordingly. As seen in FIG. 3A, black generation algorithm 160 is applied to CMY color data 150 in order to generate CMYK color data 170. In general, black generation algorithm 160 inspects the values of each of the color components of CMY color data 150 and determines, according to a specific algorithm, which components or combination of components of CMYK color data 150 can be represented by a black component. Specifically, CMY color data 150 includes cyan color component 151, magenta color component 152, and yellow color component 153. Each of the aforementioned color components is represented by a value ranging from zero percent to 100 percent. In this manner, each pixel of a color image can be represented by a CMY triad, wherein the value of each color component of the color triad represents the amount to which that color component contributes to the color appearance of the pixel. It is generally known that certain combinations of the aforementioned color components will result in a black appearance, or some shade thereof.

For instance, a color pixel represented by a CMY triad of CMY color data 150 may have a value for cyan color component 151 of 20 percent, a value for magenta color component 152 of 40 percent, and a value for yellow color component 153 of 60 percent. If it is assumed that a combination of equal values of these three color components results in a black appearance, then a common amount of 20 percent can be removed from each of cyan color component 151, magenta color component 152 and yellow color component 153 and replaced with a K color component to represent the black appearance. Therefore, according to the aforementioned example, 20 percent is would be removed from each of the color components of CMY color data 150 to result in CMYK color data 170 in which the removed portions of the CMY color components are represented by newly added K color component 174. Accordingly, in this example of a black generation algorithm, black generation algorithm 160 generates CMYK color data 170 in which the removed portions of C, M and Y color components 151 to 153 are now represented by K color component 174 having a value of 20 percent. CMYK color data 170 therefore has a value for cyan color component 171 of zero percent, a value for magenta color component 172 of 20 percent, a value for yellow color component 173 of 40 percent and a value for K color component 174 of 20 percent. In this manner, black generation algorithm 160 reproduces the same appearance of a color pixel originally represented by a CMY color triad by generating a CMYK color combination in which black, gray and/or white aspects of the color pixel are represented by an added K color component.

Accordingly, black generation algorithm 160 is typically used when generating color data to be rendered by a device which uses a four-colorant combination of cyan, magenta, yellow and black colorants. For example, a color image on a color monitor may be passed to a color management system for conversion to CMYK color data to be rendered by a destination device using CMYK colorants, such as printers 50 and 90. In such a case, the color image data displayed on the monitor is represented by an RGB (red, green, blue) color triad which is transformed into a device-independent color space, such as Lab. The Lab color data is then transformed directly to a CMY color triad, and a black generation algorithm is then applied to the CMY color triad to generate a CMYK color combination. In this manner, the transformation sequence results in a CMYK color combination which attempts to preserve the appearance of each color pixel of the original image as displayed on the monitor. This is accomplished by transforming the original color data into a CMY color triad and then generating a K color component to represent some or all of each of the color pixels.

Figure 3B:
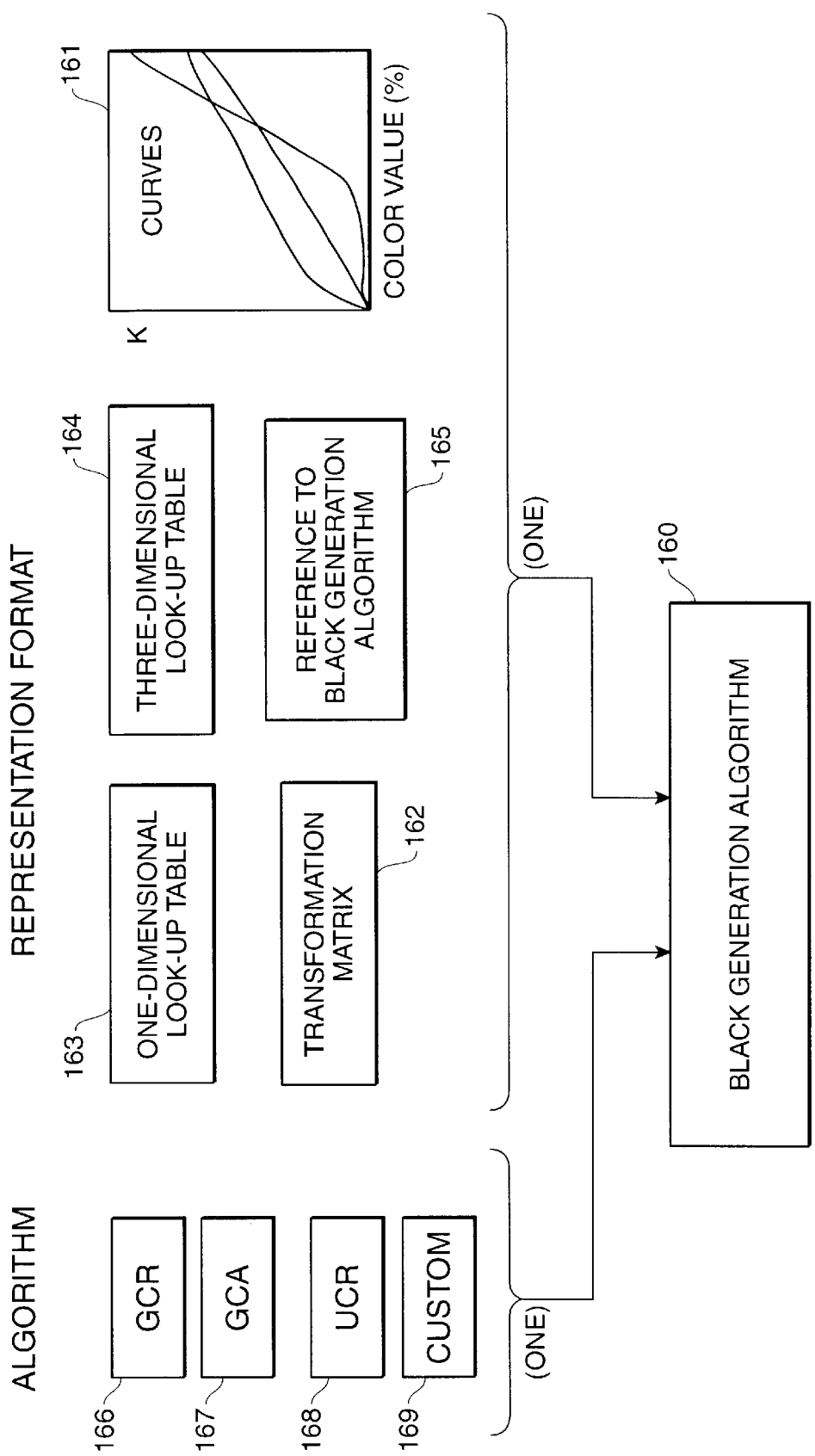
FIG. 3B is a view for providing a system level explanation of a composition and format of a black generation algorithm according to the present invention.

Turning to FIG. 3B, it can be seen that black generation algorithm 160 may be comprised of one of several different algorithms 166 to 169, and may be presented in one of several different formats 161 to 165. For example, black generation algorithm may be comprised of one of gray component replacement algorithm 166, gray component addition algorithm 167, undercolor removal algorithm 168 or a customized algorithm 169. Gray component replacement algorithm 166 is an algorithm that reduces appropriate amounts of the C, M and Y color components of a CMY color triad and replaces the removed amounts with a corresponding K color component. In this manner, a black appearance of a color pixel can be represented by a K component instead of a combination of C, M and Y components. In the alternative, black generation algorithm 160 may be comprised of gray component addition algorithm 167. Gray component addition algorithm (GCA) 167 is essentially the opposite of gray component replacement algorithm 166. Gray component addition (GCA) algorithm 167 therefore adds an appropriate amount to the value of the C, M and Y color components in order to represent a black aspect of a color pixel. Black generation algorithm 160 can be undercolor removal (UCR) algorithm 168 which is essentially similar to gray component replacement algorithm 166 except that the cyan, magenta and yellow color components are only reduced and replaced with a K component in areas of the color image comprising neutral tones. Black generation algorithm 160 may instead be a custom algorithm such as custom algorithm 169 which may be an algorithm designed by the developer of black generation algorithm 160, or which may be a user-generated algorithm for achieving optimal color management performance under certain conditions. It can be appreciated that black generation algorithm 160 is comprised of only one of the aforementioned algorithms 166 to 169.

In addition to being comprised of one several different types of algorithms, black generation algorithm 160 is represented in one of several different types of formats, such as formats 161 to 165 as depicted in FIG. 3B. For example, black generation algorithm 160 may be comprised of a set of data which represents set of curves 161 in which the K component is determined by the value of each of the C, M and Y components. Black generation algorithm 160 may instead be comprised of a set of data representing transformation matrix 162 which outputs a K component value based on the C, M and Y color component values of a CMY color triad. In the alternative, black generation algorithm 160 may be a set of data representing one-dimensional look-up table 163 in which a K component value is output based on at least one of the color components of a CMY color triad. In a similar manner, black generation algorithm 160 may be a set of data representing three-dimensional look-up table 164 in which a K component is output based on the value of the C, M and Y color components of a CMY color triad. Black generation algorithm 160 may instead be comprised of reference 165, such as a memory address, to a particular black generation algorithm, preferably the same black generation algorithm used to generate source CMYK color data. In this manner, black generation algorithm 160 can be represented in one of several different data formats for efficient access and use by a color management system.

Figure 4A:
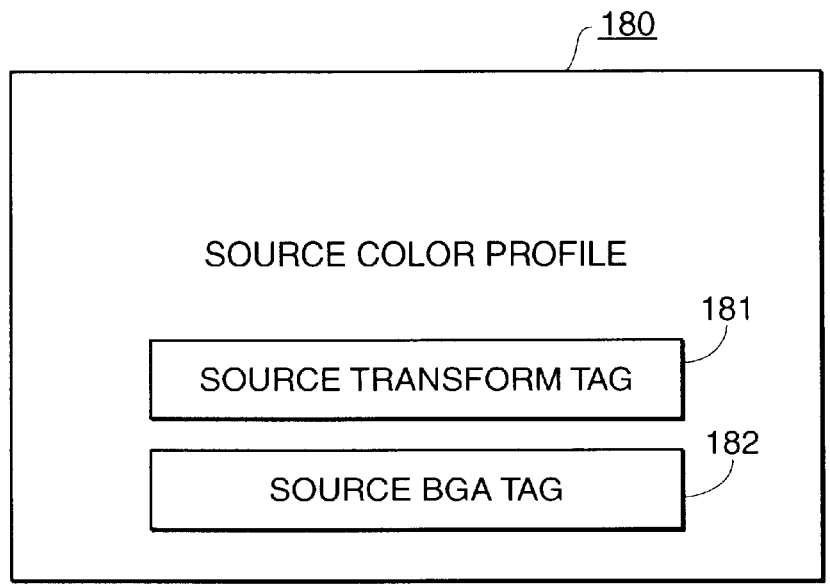
FIG. 4A is a view for providing an explanation of a source color profile according to one embodiment of the invention.
Figure 4B:
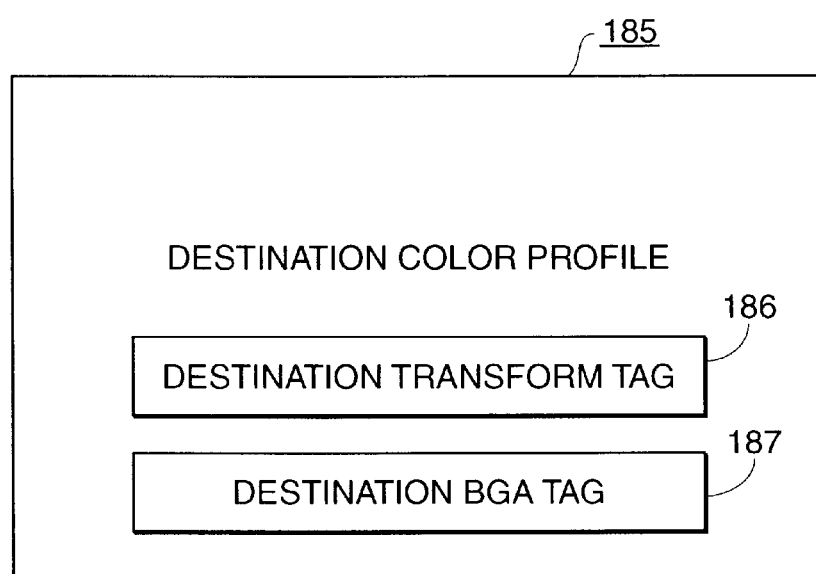
FIG. 4B is a view for providing an explanation of a destination color profile according to one embodiment of the invention.

FIGS. 4A and 4B provides views for explaining source and destination color profiles for use in a color management system according to the present invention. These color profiles preferably correspond to color devices. For example, referring to FIG. 2, printer color profile 141 corresponds to printer 50, and therefore contains data regarding the color characteristics of printer 50. As can be seen in FIG. 4A, source color profile 180 is a formatted data file for access and use by a color management system. Preferably, source color profile 180 corresponds to a particular color device, such as printer 50 or printer 90, and is formatted according to a predetermined, standardized format. One such standardized format is developed and maintained by the International Color Consortium (ICC), thereby making such color profiles generally accessible and usable by various different color management systems. As in the ICC format, source color profile 180 of FIG. 4 is comprised of tags to represent various relevant pieces of information for access and use by a color management system. Specifically, source color profile 180 includes transform tag 181 and black generation algorithm (BGA) tag 182. Transform tag 181 is preferably composed of a CMY/PCS transform which is used to transform color data represented by CMY color values in a color space of the source device to a profile connection space (PCS) which is device-independent. The PCS is generally used as an interim color space by a color management system for subsequent transformation of color data to a color space corresponding to another device, such as a particular destination device. Preferably, according to the present invention; the CMY/PCS transform is reversible such that the transform data contained in transform tag 181 can be used to go from CMY to PCS color space, and also to go from PCS to CMY color space. BGA tag 182 is preferably a tag which either refers to, or contains, a black generation algorithm as described in FIGS. 3A and 3B. In this manner, both the color transform and black generation algorithm corresponding to a particular source device are conveniently packaged in a standardized format for use by a color management system. As described above, the black generation algorithm represented by BGA tag 182 is comprised of one of several different algorithms, such as algorithms 166 to 169 of FIG. 3B. In addition, the black generation algorithm represented by BGA tag 182 is comprised of a set of data in one of several different formats or reference, such as formats 161 to 165 as depicted in FIG. 3B.

Referring to FIG. 4B, destination color profile 185 is depicted in a similar manner to source color profile 180 of FIG. 4A. Accordingly, destination color profile 185 is a formatted data file which corresponds to a particular destination color device, such as printer 50 or printer 90, wherein the format is a predetermined, standardized format. Preferably the format is the standardized format developed and maintained by (ICC). Similar to source color profile 180 of FIG. 4A, destination color profile 185 includes transform tag 186 and black generation algorithm (BGA) tag 187. Transform tag 181 is preferably composed of a CMY/PCS transform which is used to transform color data represented by CMY color values in the color space of the destination device to a device-independent, profile connection space (PCS). Preferably the CMY/PCS transform is reversible. BGA tag 187 preferably refers to, or contains, a black generation algorithm as described in FIGS. 3A and 3B. In this manner, both the color transform and black generation algorithm corresponding to a particular destination device are conveniently packaged in a standardized format for use by a color management system. As described above, the black generation algorithm represented by BGA tag 187 is comprised of one of several different algorithms, such as algorithms 166 to 169 of FIG. 3B. In addition, the black generation algorithm represented by BGA tag 187 is comprised of a set of data in one of several different formats or of a reference, such as formats 161 to 164 and reference 165 as depicted in FIG. 3B.

Figure 5:
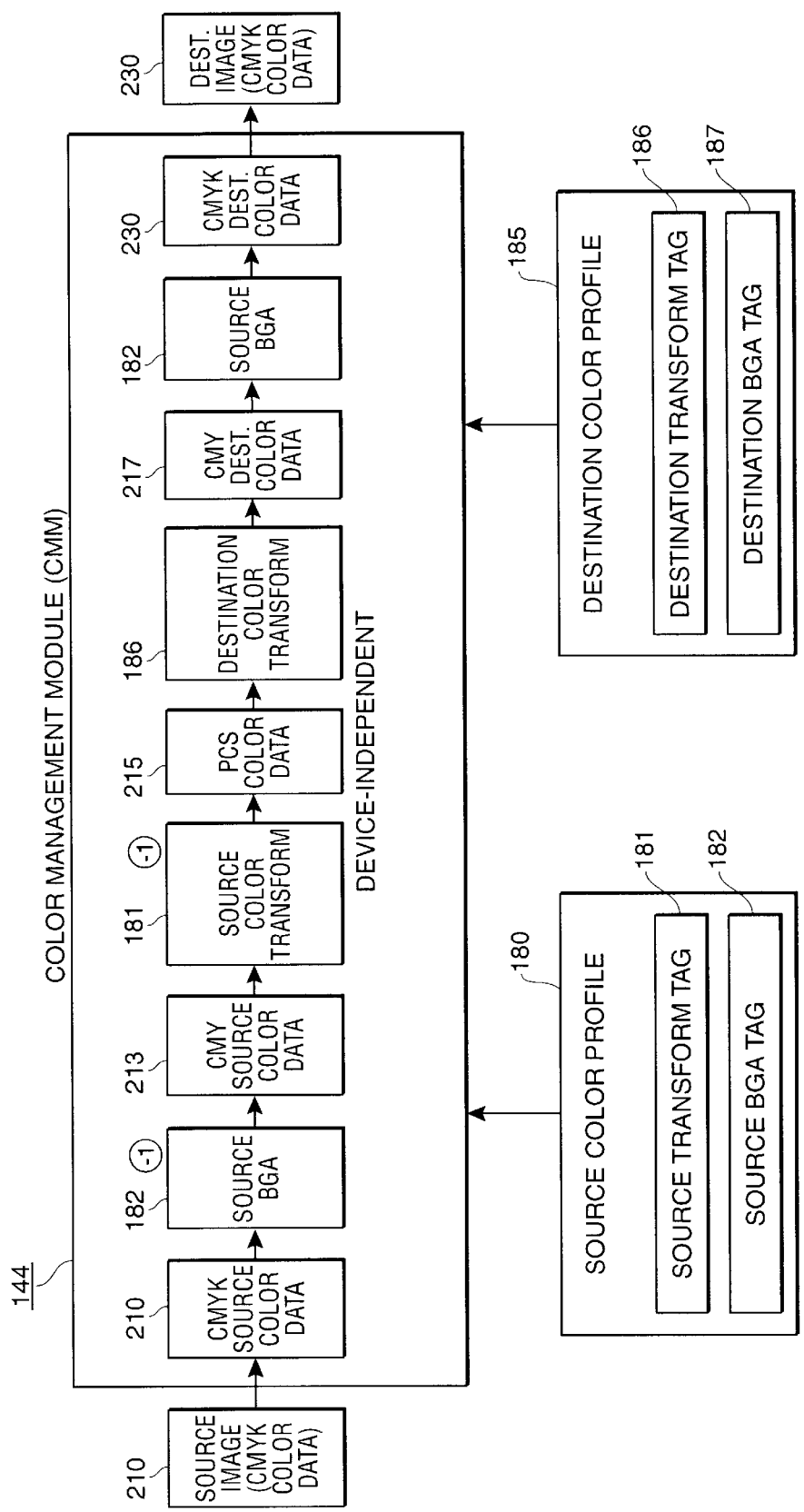
FIG. 5 is a view for providing a system level explanation of a color management system according to the present invention.

FIG. 5 provides a system level block diagram for explaining a transformation sequence performed by a color management module according to the present invention. As can be seen in FIG. 5, source CMYK color data 210 is input to a color management module 144 for generating CMYK destination color data 230. Color management module 144 therefore is used to transform CMYK color data from a color space corresponding to a first device, such as printer 50, into CMYK color data corresponding to a second device, such as printer 90. It can therefore be appreciated that the present invention is advantageous in color transformation sequences used for proofing the appearance of a color image on one printer as it would appear on a second printer, both of which use C, M, Y and K colorants to render an image.

As also depicted in FIG. 5, color management module 144 utilizes two color profiles to perform the transformation sequence; source color profile 180 and destination color profile 185. Each of these color profiles comprises a transform tag and a black generation algorithm tag as described above with respect to FIG. 4. Specifically, source color profile 180 is a color profile corresponding to a source device; preferably the source device for which CMYK source color data 210 was generated. For example, CMYK source color data 210 is provided in a color space corresponding to a source device such as printer 50. In such an example, it is desired to transform CMYK source color data 210 into CMYK destination color data 230 for rendering on a destination device, such as printer 90, thereby allowing improved proofing of a color image on a second printer as it would appear on a first printer.

Source color profile 180 contains transform tag 181 which, as discussed above with respect to FIG. 4, refers to or contains a color transform which is used to transform color data from the CMYK color space of the source device into a device-dependent profile connection space (PCS). Source color profile 180 also includes black generation algorithm (BGA) tag 182 which refers to or contains data representing a black generation algorithm, as described above with respect to FIG. 4. BGA tag 182 preferably contains a set of data representing the same black generation algorithm which was previously used to generate the K component (channel) of source CMYK color data 210. In a similar manner, destination color profile 185 contains transform tag 186 and BGA tag 187, as described above with respect to FIG. 4, and corresponds to a destination device, such as printer 90.

Turning to the transformation sequence of FIG. 5, it can be seen that color management module 144 accesses CMYK source color data 210 for application of the transformation sequence necessary to generate CMYK destination color data 230. In this regard, color management module 144 accesses source color profile 180 to obtain source BGA tag 182. An inverse of source black generation algorithm 182 is applied to CMYK source color data 210 in order to fold the K component of CMYK source color data 210 back into the C, M and Y color components. In this manner, by using an inverse of the same black generation algorithm that was used to initially create the K component of CMYK source color data 210, the color aspect represented by the K component is folded back into the C, M and Y components. CMY source color data 213 is thereby generated which is similar to the original CMY color triad that was used to create source CMYK color data 210.

Next, color management module (CMM) 144 accesses source transform tag 181 of source color profile 180 and applies it to CMY source color data 213 to transform CMY source color data 213 into profile connection space (PCS) color data 215. As previously mentioned, PCS color data 215 is an intermediate, device-independent color space. CMM 144 then accesses destination color profile 185 to obtain destination transform tag 186. Destination color transform 186 is then used to transform PCS color data 215 into CMY destination color data 217. In this manner, the color data is transformed into C, M and Y color components in the color space of a destination device, such as printer 90. Such color data is not ready for rendering by the destination device, however, because the destination device renders a color image by using C, M, Y and K colorants. Therefore, CMM 144 applies source black generation algorithm 182 to CMY destination color data 217 in order to generate CMYK destination color data 230. In this manner, the same source black generation algorithm 182 is used to generate the K component of CMYK destination color data 230 as was originally used to generate the K component of CMYK source color data 210. CMYK destination color data 230 is thereupon output for rendering by a destination device, such as printer 90. In this manner, the appearance of black, white and gray aspects of the color image are represented by a K component for rendering by the destination device in a same technique as the source device, thereby resulting in improved proofing of the color image.

Figure 6:
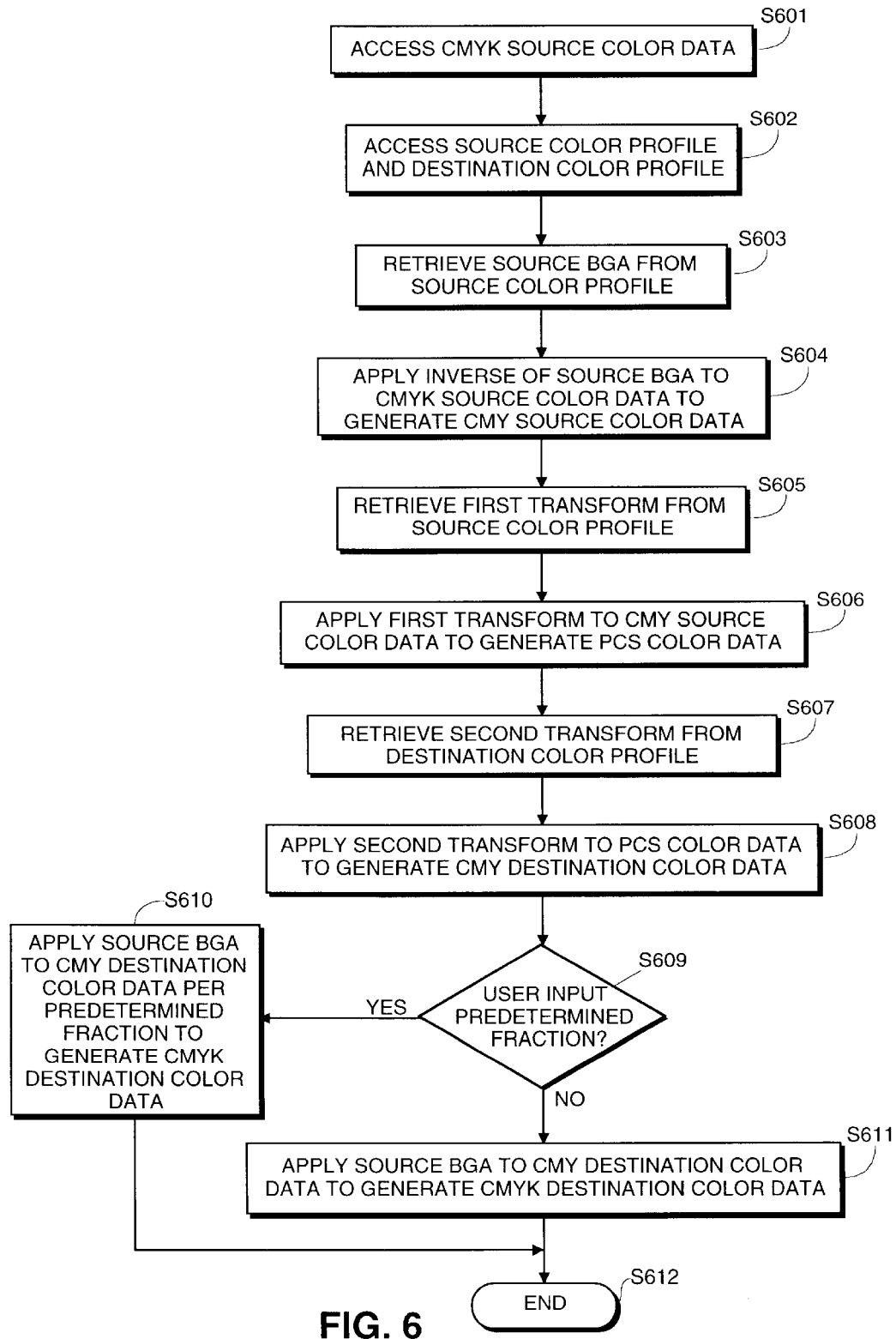
FIG. 6 is a flowchart for providing a detailed explanation of a color management system according to one embodiment of the invention.

FIG. 6 is a flowchart for explaining the color management system according to the present invention. As discussed above, the present invention may be practiced in a color management program, such as one of application programs 131 on fixed disk 45 of computing device 40, or may be practiced in a device driver, such as printer 134 on fixed disk 45 of computing device 40. In step S601, CMYK source color data is accessed for color management according to the present invention. A source color profile and a destination color profile are then accessed in step S602. As described above with respect to FIGS. 4 and 5, each of the source color profile and the destination color profile include tags containing a color transform and a black generation algorithm. In step S603, the source black generation algorithm is retrieved from the source color profile for use by the color management system. An inverse of the source black generation algorithm is applied to the CMYK source color data to transform the CMYK source color data into CMY source color data (step S604). This application folds the K component back into the C, M and Y components. As discussed with respect to FIG. 5, the color management system uses the same black generation algorithm that was originally used to generate the K component of the CMYK source color data, thereby ensuring that the CMY source color data reincorporates the K component in the inverse manner that the K component was originally created. The desired appearance of the black, white and gray aspects of the color image is thereby preserved in the same style during the transformation of color data to a color space of another device.

In step S605, a first color transform is retrieved from the source color profile. As described with respect to FIG. 5, the first color transform is used to transform CMY color data to device-independent, profile connection space (PCS), and is reversible to transform color data in the opposite direction. Accordingly, in step S606, the first color transform is applied to the CMY source color data in order to generate device-independent, PCS color data. A second color transform is then retrieved from the destination color profile, and is used for transforming the CMY color data to device-independent, PCS color data, and the reverse thereof, also (step S607). In this regard, it can be appreciated that the first transform which was retrieved from the source color profile corresponds to the CMY color space of the source device, and the second transform retrieved from the destination color profile corresponds to the destination device. The second transform is then applied to the device-independent, PCS color data in order to generate CMY destination color data (step S608). As discussed with respect to FIG. 5, it is desired to generate destination color data in a CMYK colorant combination, and therefore a K component must be generated and added to the CMY destination color data.

A determination is then made whether a user of the color management system has input a predetermined fraction in step S609. The predetermined fraction is used to determine the level of black generation algorithm to apply to the CMY destination color data in order to generate CMYK destination color data. For example, this allows a user to control the level of replacement of C, M and Y components with a K component by the black generation algorithm. The user can input such a predetermined fraction via keyboard 46 and/or pointing device 47 of computing device 40, for example. In the case that a predetermined fraction was input by the user, the source black generation algorithm is accessed and applied to the CMY destination color data at a level in accordance with the predetermined fraction in order to generate the CMYK destination color data. In this manner, the user can adjust the level of effect that the black generation algorithm has when replacing C, M and Y color components of the CMY destination color data with the K channel in the CMYK destination color data. The CMYK destination color data is then ready for rendering by the destination device which uses C, M, Y and K colorants (step S610). Flow then passes to step S612, which is the end of the process.

If the user has not input a predetermined fraction in step S609, flow passes to step S611 in which the source black generation algorithm is accessed and applied to the CMY destination color data to generate CMYK destination color data. Upon completion of the application of the source black generation algorithm, the CMYK destination color data is ready for rendering by the destination device which uses C, M, Y and K colorants to render the color image. Flow then passes to the end of the process in step S612.

The present invention therefore provides a color management system in which the same technique which was originally used to generate the K component of the CMYK source color data is accessed and utilized in order to generate the K component of the CMYK destination color data. In this manner, the representation of black, gray and white components of color pixels of the color image is preserved in a consistent manner between the source CMYK color data and the destination CMYK color data. This preservation of the representation of black, gray and white pixels is advantageous in proofing scenarios where a color image in CMYK color space is transformed into a color image in another CMYK color space which corresponds to a different image rendering device. Accordingly, black ink is used to render the color image by the destination device in a similar manner as it is used by the source device to render the image. In addition, the same black generation algorithm used to generate the K component of the CMYK source color data is conveniently provided in a formatted, standardized color profile for efficient access and utilization by a profile-based color management system. The present invention therefore provides for the consistent appearance of a color image between a source device and a destination device while reducing the introduction of unwanted color hues and incorrect contrast effects in the color image.

The invention has been described with respect to particular illustrative embodiments. It is to be understood that the invention is not limited to the above-described embodiments and that various modifications may be made by those of ordinary skill in the art without departing from the spirit and scope of the invention.

What is claimed is:

1. A method for managing color data to transform CMYK source color data from a source device into CMYK destination color data for rendering by a destination device, the "K" channel of the CMYK source color data having been generated by a source black generation algorithm, said method comprising the steps of:

accessing a source color profile which contains a copy of or reference to the source black generation algorithm;

applying an inverse of the source black generation algorithm to the CMYK source color data to generate CMY source color data;

transforming the CMY source color data into device-independent color data;

transforming the device-independent color data into CMY destination color data; and applying the source black generation algorithm obtained in the accessing step to the CMY destination color data to generate the CMYK destination color data.

2. A method for managing color data according to claim 1, wherein the source color profile also contains a transform for transforming color data from a first color space to a second color space.

3. A method for managing color data according to claim 1, wherein the source black generation algorithm is comprised of set of data.

4. A method for managing color data according to claim 3, wherein the set of data is comprised of data representing a set of curves for transforming CMY color data to CMYK color data.

5. A method for managing color data according to claim 3, wherein the set of data is comprised of data representing a transform matrix for transforming CMY color data to CMYK color data.

6. A method for managing color data according to claim 3, wherein the set of data is comprised of data representing a look-up table for transforming CMY color data to CMYK color data.

7. A method for managing color data according to claim 6, wherein the look-up table is a one-dimensional look-up table.

8. A method for managing color data according to claim 6, wherein the look-up table is a three-dimensional look-up table.

9. A method for managing color data according to claim 1, wherein the source color profile is a data file which is formatted pursuant to a predetermined standard.

10. A method for managing color data according to claim 9, wherein the source color profile has a plurality of tags, including a first tag which contains a transform for transforming color data from a first color space to a second color space, and a second tag which contains the copy of, or the reference to, the source black generation algorithm.

11. A method for managing color data according to claim 1, wherein the source black generation algorithm is a gray component replacement algorithm.

12. A method for managing color data according to claim 1, wherein the source black generation algorithm is a gray component addition algorithm.

13. A method for managing color data according to claim 1, wherein the source black generation algorithm is an undercolor removal algorithm.

14. A method for managing color data according to claim 1, wherein the source black generation algorithm is a custom algorithm.

15. A method for managing color data according to claim 1, wherein a predetermined fraction is used to apply a corresponding fractional amount of the source black generation algorithm to the CMY output color data to generate the CMYK destination color data.

16. A method for managing color data according to claim 15, wherein the predetermined fraction is based on a user input.

17. A method for managing color data according to claim 1, wherein the method is performed in a color management software program.

18. A method for managing color data according to claim 1, wherein the method is performed in a device driver.

19. A method for managing color data according to claim 18, wherein the device driver corresponds to the destination device.

20. A method for managing color data to transform CMYK source color data from a source device into CMYK destination color data for rendering by a destination device, the "K" channel of the CMYK source color data having been generated by a source black generation algorithm, said method comprising the steps of:

accessing a source color profile corresponding to the source device and a destination color profile corresponding to the destination device, the source color profile containing a first transform and a copy of or reference to the source black generation algorithm, and the destination color profile containing a second transform;

applying an inverse of the source black generation algorithm to the CMYK source color data to generate CMY source color data;

applying the first transform to the CMY source color data to generate device-independent color data;

applying the second transform to the device-independent color data to generate CMY destination color data; and applying the source black generation algorithm obtained in the accessing step to the CMY destination color data to generate the CMYK destination color data.

21. An apparatus for managing color data to transform CMYK source color data from a source device into CMYK destination color data for rendering by a destination device, comprising:

a program memory for storing process steps executable to perform a method according to any of claims 1 to 20; and a processor for executing the process steps stored in said program memory.

22. Computer-executable process steps stored on a computer readable medium, said computer-executable process steps for managing color data to transform CMYK source color data from a source device into CMYK destination color data for rendering by a destination device, said computer-executable process steps comprising process steps executable to perform a method according to any of claims 1 to 20.

23. A computer-readable medium which stores computer-executable process steps, the computer-executable process steps to manage color data to transform CMYK source color data from a source device into CMYK destination color data for rendering by a destination device, said computer-executable process steps comprising process steps executable to perform a method according to any of claims 1 to 20.

* * * * *